(12) United States Patent
Choi et al.

(10) Patent No.: US 10,008,732 B2
(45) Date of Patent: Jun. 26, 2018

(54) SOLID OXIDE FUEL CELL STACK

(71) Applicant: MICO CO., LTD., Anseong-si (KR)

(72) Inventors: Song Ho Choi, Anseong-si (KR); Jin Ah Park, Anseong-si (KR); Ki Moon Han, Anseong-si (KR); Se Heon Oh, Anseong-si (KR)

(73) Assignee: MICO CO., LTD, Anseong-si (KR)

( * ) Notice: Subject to any disclaimer, the term of this patent is extended or adjusted under 35 U.S.C. 154(b) by 501 days.

(21) Appl. No.: 14/418,240

(22) PCT Filed: Mar. 24, 2014

(86) PCT No.: PCT/KR2014/002441
§ 371 (c)(1),
(2) Date: Jan. 29, 2015

(87) PCT Pub. No.: WO2014/208869
PCT Pub. Date: Dec. 31, 2014

(65) Prior Publication Data
US 2015/0263372 A1    Sep. 17, 2015

(30) Foreign Application Priority Data

Jun. 27, 2013    (KR) .......................... 10-2013-0074584

(51) Int. Cl.
*H01M 8/24* (2016.01)
*H01M 8/2425* (2016.01)
(Continued)

(52) U.S. Cl.
CPC ....... *H01M 8/2425* (2013.01); *H01M 8/0273* (2013.01); *H01M 8/247* (2013.01);
(Continued)

(58) Field of Classification Search
CPC .. H01M 8/2425; H01M 8/247; H01M 8/0273; H01M 8/248
See application file for complete search history.

(56) References Cited

U.S. PATENT DOCUMENTS

| 4,834,569 A * | 5/1989 | Foote | .................... F16B 5/0241 403/179 |
| 2003/0077500 A1* | 4/2003 | Gorbell | ............... H01M 8/0247 429/460 |

(Continued)

FOREIGN PATENT DOCUMENTS

| CA | 2415388 A1 | 1/2002 |
| JP | 2006-310005 A | 11/1916 |

(Continued)

*Primary Examiner* — Devina Pillay
(74) *Attorney, Agent, or Firm* — Norton Rose Fulbright US LLP (57) ABSTRACT

Disclosed is a solid oxide fuel cell stack. The solid oxide fuel cell stack includes a unit cell, a cell frame configured to support an edge of the unit cell, a interconnecting member disposed under the cell frame, a sealing member disposed between the cell frame and the interconnecting member, and a spacer member configured to uniformly maintain an interval between the cell frame and the interconnecting member. The spacer member is disposed at an area between the cell frame and the interconnecting member, which is not sealed by the sealing member, and formed of a mica or insulating ceramic.

7 Claims, 8 Drawing Sheets

(51) Int. Cl.
*H01M 8/2465* (2016.01)
*H01M 8/0273* (2016.01)
*H01M 8/247* (2016.01)
*H01M 8/124* (2016.01)

(52) U.S. Cl.
CPC .. *H01M 8/2465* (2013.01); *H01M 2008/1293* (2013.01); *H01M 2300/0074* (2013.01)

(56) References Cited

U.S. PATENT DOCUMENTS

| | | | | |
|---|---|---|---|---|
| 2007/0134537 A1* | 6/2007 | Reisdorf | ............ | H01M 8/0282 429/465 |
| 2009/0004544 A1* | 1/2009 | Mukerjee | ............ | C03C 14/002 429/469 |
| 2009/0311570 A1* | 12/2009 | Chou | ................. | H01M 8/0271 429/469 |
| 2010/0055525 A1* | 3/2010 | Uematsu | ............ | H01M 8/248 429/480 |
| 2011/0171554 A1 | 7/2011 | Hayashi et al. | ............. | 429/456 |

FOREIGN PATENT DOCUMENTS

| | | | |
|---|---|---|---|
| JP | 2005-317291 A | 11/2005 |
| JP | 2006-085981 A | 3/2006 |
| JP | 2007-328969 A | 12/2007 |
| KR | 10-2013-0016140 A | 2/2013 |

* cited by examiner

SOLID OXIDE FUEL CELL STACK

CROSS-REFERENCED TO RELATED APPLICATION

This application is a national phase application under 35 U.S.C. § 371 of International Patent Application No. PCT/KR2014/002441 filed on Mar. 24, 2014, which claims priority to and the benefit of Korean Patent Application No. 10-2013-0074584, filed on Jun. 27, 2013. The disclosures of the referenced applications are incorporated herein by reference in its entirety.

BACKGROUND

1. Field of the Invention

The present invention relates to a solid oxide fuel cell stack, and more particularly, to a solid oxide fuel cell stack which directly converts chemical energy of a raw material into electric energy through an electrochemical reaction.

2. Discussion of Related Art

Fuel cells are devices which directly convert chemical energy of a raw material into electric energy through an electrochemical reaction, and have some advantages in that energy efficiency thereof is high, compared with a general heat engine, and pollutants are rarely produced.

Among the fuel cells, a solid oxide fuel cell is operated at a high temperature of 600 to 1000° C., and thus may freely use a hydrocarbon or hydrogen-based fuel through internal reforming without a reformer. Further, the solid oxide fuel cell has a fuel conversion efficiency of 45 to 65%, and may have a system efficiency of 85% or more through a cogeneration system using waste heat, thereby receiving attention as a next generation eco-friendly electricity generating means.

The solid oxide fuel cell may be classified into a planar type solid oxide fuel cell and a cylindrical solid oxide fuel cell according to a type of unit cell. The cylindrical solid oxide fuel cell is advantageous in the aspect of long term stability, and the planar type solid oxide fuel cell may obtain higher power density than the cylindrical solid oxide fuel cell. Recently, a flat tubular solid oxide fuel cell in which advantages of the planar type solid oxide fuel cell and the cylindrical solid oxide fuel cell are combined has been studied.

When the solid oxide fuel cell is formed in a stacked type using a connecting material and a sealing member, a system having a capacity of a few W or a few MW or more may be realized, and thus a study on a solid oxide fuel cell stack is being widely performed.

In particular, a planar type or flat tubular solid oxide fuel cell stack has many advantages, but also has some disadvantages in that thermo-mechanical properties associated with sealing are weak, and thermal stability is low, when operated for a long period of time at a high temperature. Therefore, to overcome the disadvantages, various studies are being carried out.

SUMMARY OF THE INVENTION

The present invention is directed to a solid oxide fuel cell stack which has improved thermal and electrical stability.

According to an aspect of the present invention, there is provided a solid oxide fuel cell stack including a unit cell of a solid oxide fuel cell, a cell frame configured to support an edge of the unit cell, a interconnecting member disposed under the cell frame and electrically connected with the unit cell, a sealing member disposed between the cell frame and the interconnecting member, and a spacer member configured to uniformly maintain an interval between the cell frame and the interconnecting member. The spacer member is disposed at an area between the cell frame and the interconnecting member, which is not sealed by the sealing member, and formed of Mica or insulating ceramic.

The solid oxide fuel cell stack may further include a fastening member which passes through the cell frame and the interconnecting member, and the spacer member may include a fastening hole into which the fastening member is inserted. For example, the cell frame and the interconnecting member may have a plurality of corners, and the spacer member may include a plurality of corner spacers disposed to be adjacent to the plurality of corners, respectively, and the fastening member may include a plurality of bolts which pass through the plurality of corner spacers, respectively.

Each of the corner spacer may include a coating film formed on one of a surface of the cell frame and a surface of the interconnecting member.

The solid oxide fuel cell stack may further include a fastening member which passes through the cell frame and the interconnecting member, and the spacer member may include a plurality of spacer patterns disposed to be adjacent to the fastening member. In this case, an insertion groove into which the spacer pattern is inserted may be formed in one of a surface of the cell frame and a surface of the interconnecting member.

According to another aspect of the present invention, there is provided a solid oxide fuel cell stack including an upper plate, a lower plate spaced from the lower plate, a unit cell stacking structure disposed between the upper plate and the lower plate, and a fastening member which couples the upper plate, the lower plate and the unit cell stacking structure with each other. The fastening member may include a bolt passing through the upper plate, the unit cell stacking structure and the lower plate, a nut fastened to one end of the bolt, and a washer disposed between the nut and the upper plate or between the nut and the lower plate and formed of a material having a greater thermal expansion coefficient than that of the bolt.

The bolt may include an insulating film formed on a surface thereof located in the unit cell stacking structure and formed of an insulating ceramic or glass material.

The fastening member may have a through hole which is formed in a stack of the upper plate, the unit cell stacking structure and the lower plate and through which the bolt passes, and may further include a tubular insulating material formed of an insulating material.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. Although the present invention can be modified variously and have several embodiments, specific exemplary embodiments are illustrated in the accompanying drawings and will be described in detail in the detailed description. However, the present invention is not limited to the embodiments, and it should be understood that the present invention comprises all of equivalents and substitutes included in the technical scope and spirit of the invention. In the drawings, the same components are designated by the same reference numerals, and dimensions of the elements are enlarged or reduced as appropriate for ease of understanding.

The terms used herein are merely to describe a specific embodiment, and do not limit the present invention. Further, unless the context clearly indicates otherwise, singular expressions should be interpreted to include plural expressions. It is understood that terms "comprises," "comprising," "includes" or "has" are intended to indicate the presence of features, numerals, steps, operations, elements and components described in the specification or the presence of combinations of these, and do not preclude the presence of one or more other features, numerals, steps, operations, elements and components, the presence of combinations of these, or additional possibilities.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Figure 1:
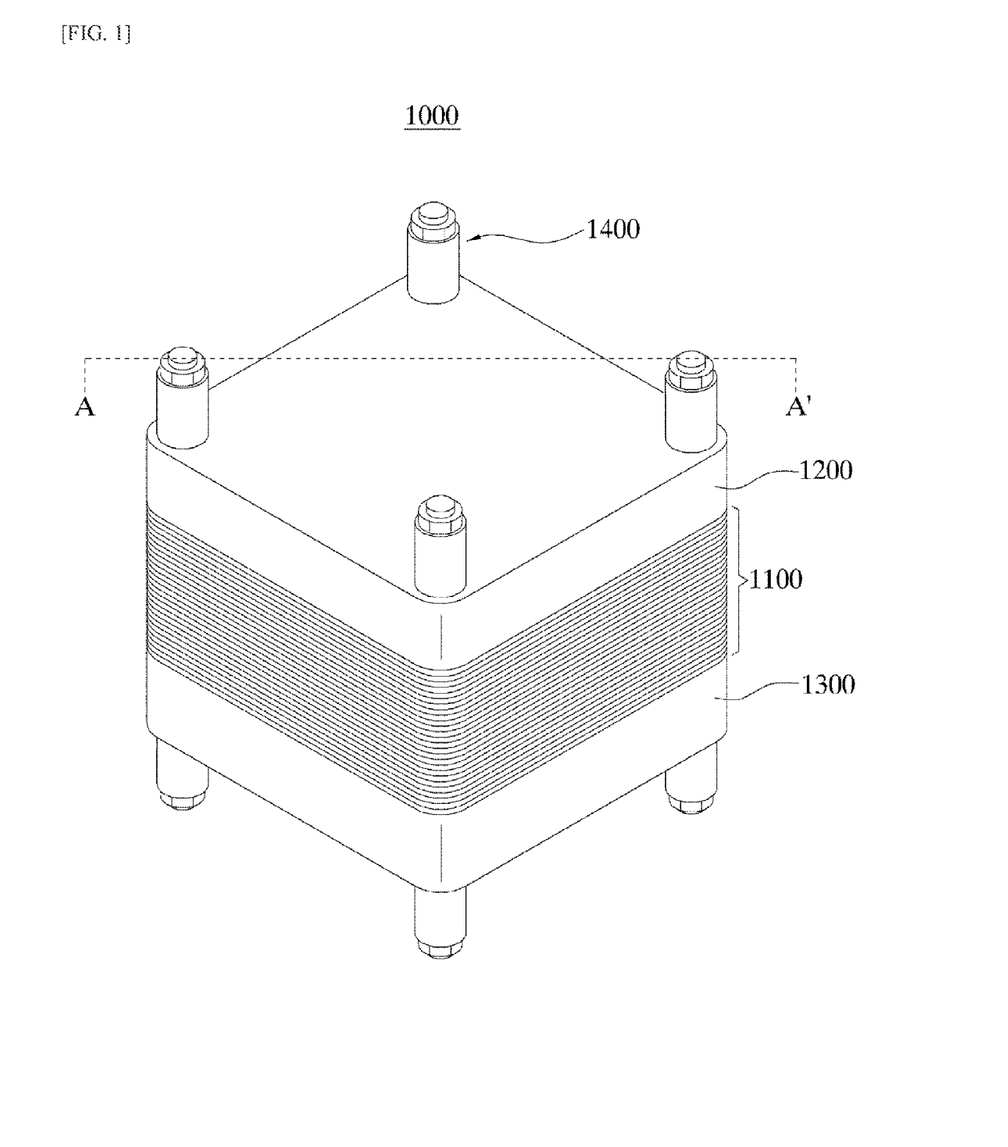
FIG. 1 is a perspective view illustrating a solid oxide fuel cell stack according to an embodiment of the present invention.
Figure 2:
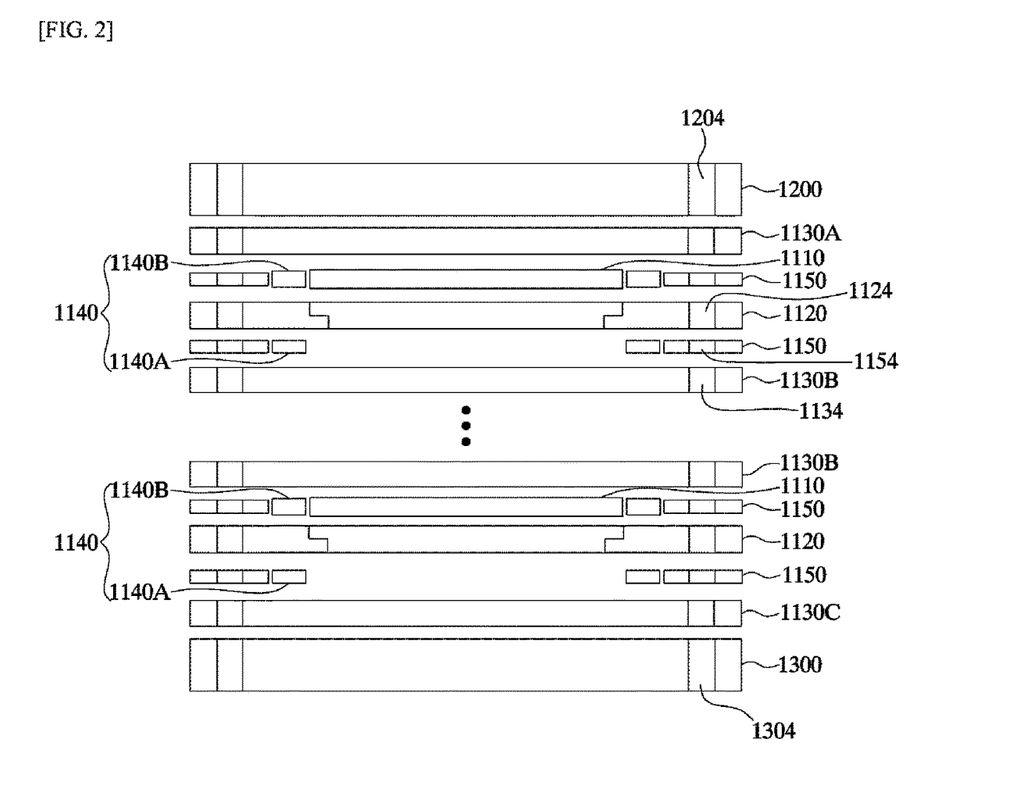
FIG. 2 is a cross-sectional view taken along line A-A' of FIG. 1.
Figure 3:
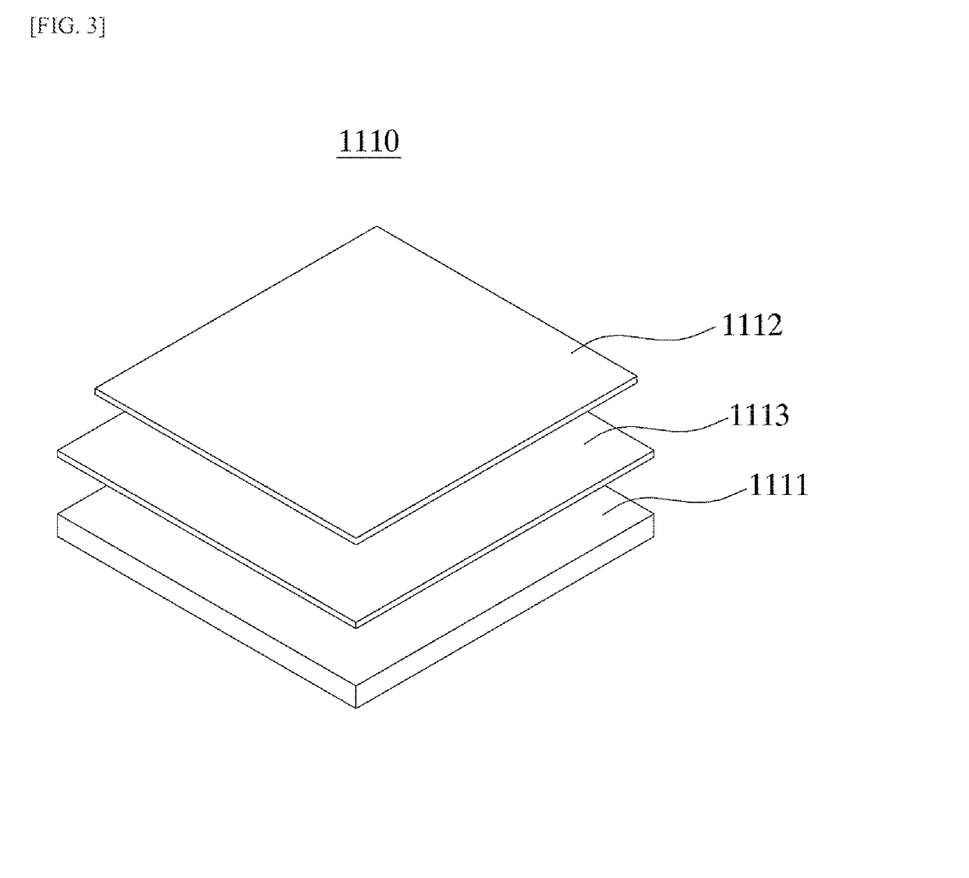
FIG. 3 is an exploded perspective view of a unit cell illustrated in FIG. 2.
Figure 4:
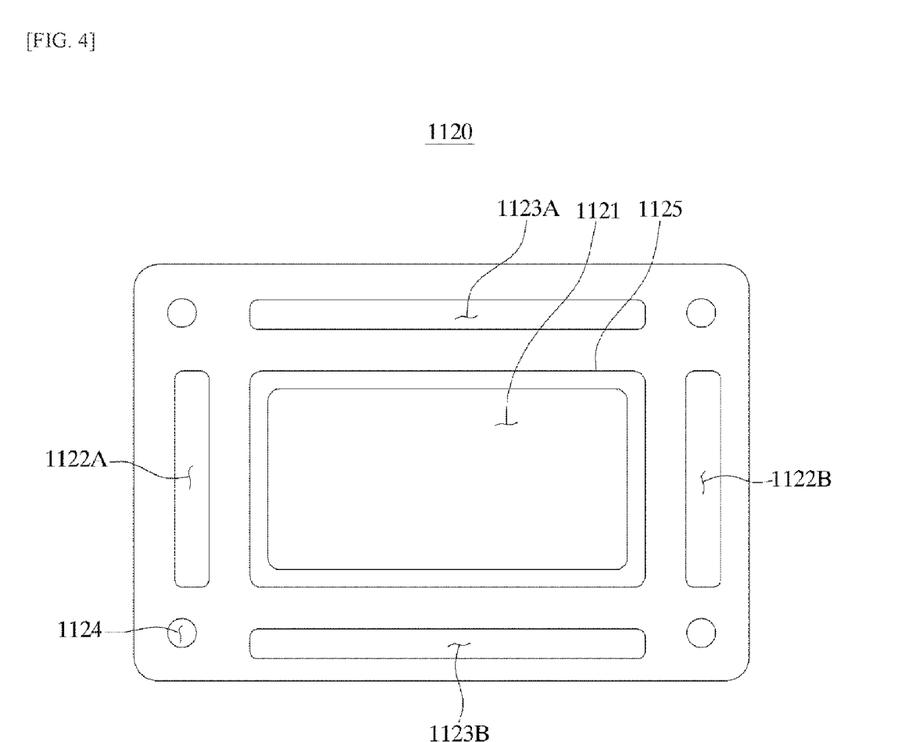
FIG. 4 is a plan view illustrating a cell frame illustrated in FIG. 2.

FIG. 1 is a perspective view illustrating a solid oxide fuel cell stack according to an embodiment of the present invention, FIG. 2 is a cross-sectional view taken along line A-A' of FIG. 1, FIG. 3 is an exploded perspective view of a unit cell illustrated in FIG. 2, and FIG. 4 is a plan view illustrating a cell frame illustrated in FIG. 2.

Referring to FIGS. 1 to 4, the solid oxide fuel cell stack 1000 according to an embodiment of the present invention includes a unit cell stacking structure 1100, an upper plate 1200, a lower plate 1300, and fastening members 1400.

The unit cell stacking structure 1100 may include a plurality of unit cells 1110, a plurality of cell frames 1120 configured to support edge portions of the unit cells 1110, a plurality of interconnecting members 1130 configured to electrically connect the unit cells 1110, a sealing member 1140 configured to prevent a fuel and air supplied to the unit cells 1110 from being mixed with each other or leaking to an outer side, and spacer members 1150 configured to enhance interval equivalence between the cell frame 1120 and the interconnecting member 1130. The unit cell stacking structure 1100 may have a structure in which the cell frames 1120 supporting the plurality of unit cells 1110 and the interconnecting members 1130 are alternately stacked, and the sealing member 1140 and the spacer member 1150 are arranged between the cell frame 1120 and the interconnecting member 1130.

Each of the unit cells 1110 may be a unit cell of a planar type solid oxide fuel cell, as illustrated in FIG. 3, or a unit cell of a flat tubular type solid oxide fuel cell, although not shown. As an example, when the unit cells 1110 are the unit cells of the planar type solid oxide fuel cell, each of the unit cells 1110 may include a first electrode 1111, a second electrode 1112, and a solid oxide electrolyte 1113 disposed between the first and second electrodes 1111 and 1112. One of the first and second electrodes 1111 and 1112 may be an anode to which the fuel is supplied, and the other may be a cathode to which the air is supplied. When the fuel containing hydrogen ($H_2$) and the air containing oxygen ($O_2$) are supplied to the anode and the cathode, respectively, oxygen ions ($O^{2-}$) reduced in the cathode by an oxygen partial pressure difference are moved to the anode via the electrolyte 1113, and the oxygen ions ($O^{2-}$) moved to the anode reacts with the hydrogen ($H_2$) provided to the anode and generates water ($H_2O$) and electrons (e). Each of the unit cells 1110 produces electric energy using the electrons generated through the above-mentioned reaction.

The anode may be formed of an electro-conductive oxide. For example, the anode may be formed of a single-element material, a compound material or a composite material including one or more selected from a group of yttrium (Y), cerium (Ce), zirconium (Zr), nickel (Ni), and the like. Also, as long as the material forming the anode is an oxide having electrical conductivity, the material is not specifically limited. The anode may be formed of a compound or a composite further including at least one other element other than the listed elements, or a single-element material, a compound or a composite including at least one other element other than the listed elements. The anode may have a porous structure through which the hydrogen ($H_2$) is moved.

The cathode may be formed of an electro-conductive oxide. For example, the cathode may be formed of a single-element material, a compound or a composite including one or more selected from a group of lanthanum (La), strontium (Sr), manganese (Mn), cobalt (Co), iron (Fe), and the like. Also, as long as the material forming the cathode is an oxide having electrical conductivity, the material is not specifically limited. The cathode may be formed of a compound or a composite further including at least one other element other than the listed elements, or a single-element material, a compound or a composite including at least one other element other than the listed elements. The cathode may have a porous structure through which the oxygen is moved.

The electrolyte 1113 may be formed of an oxygen ion conductive solid oxide. For example, the electrolyte 1113 may be formed of a single-element material, a compound or a composite including one or more selected from a group of yttrium (Y), zirconium (Zr), lanthanum (La), strontium (Sr), gallium (Ga), magnesium (Mg), barium (Ba), cerium (Ce), samarium (Sm), scandium (Sc) and the like which have high ion conductivity, excellent stability in an oxidizing-reducing atmosphere, and excellent mechanical properties. Also, as long as the material forming the electrolyte 1113 is an oxide having oxygen ion conductivity, the material is not specifically limited. The electrolyte 1113 may be formed of a compound or a composite further including at least one other element other than the listed elements, or a single-element material, a compound or a composite including at least one other element other than the listed elements. The electrolyte 1113 may have a precise structure through which the fuel and the air may not be moved.

The cell frames 1120 support the edge portions of the unit cells 1110 and improve an ability to be assembled and durability of the solid oxide fuel cell stack 1000. For example, as illustrated in FIG. 4, each of the cell frames 1120 may have a quadrangular frame structure. For example, each of the cell frames 1120 may include a channel opening 1121, a first fuel supplying opening 1122A, a first fuel discharging opening 1122B, a first air supplying opening 1123A, a first air discharging opening, and a plurality of first fastening holes 1124.

The channel opening 1121 is formed at a center portion of the cell frame 1120 to expose the lower electrode 1111, e.g., the anode of the supported unit cell 1110. A stepped portion 1125 for supporting the edge portion of the unit cell 1110 may be formed at a boundary of the channel opening 1121.

The first fuel supplying opening 1122A and the first fuel discharging opening 1122B may be formed to be spaced apart from each other in a first direction, while the channel opening 1121 is interposed therebetween. For example, the first fuel supplying opening 1122A may be formed between the channel opening 1121 and a first edge of the cell frame 1120 intersecting the first direction, and the first fuel discharging opening 1122B may be formed between the channel opening 1121 and a second edge of the cell frame 1120 opposite the first edge.

The first air supplying opening 1123A and the first air discharging opening 1123B may be formed to be spaced apart from each other in a second direction intersecting the first direction, while the channel opening 1121 is interposed therebetween. For example, the first air supplying opening 1123A may be formed between the channel opening 1121 and a third edge of the cell frame 1120 adjacent to the first edge, and the first air discharging opening 1123B may be formed between the channel opening 1121 and a fourth edge of the cell frame 1120 opposite the third edge. On the other hand, although not illustrated in the drawings, the first air supplying opening 1123A may be formed at a position adjacent to the first fuel discharging opening 1122B, i.e., between the channel opening 1121 and the second edge of the cell frame 1120, and the first air discharging opening 1123B may be formed at a position adjacent to the first fuel supplying opening 1122A, i.e., between the channel opening 1121 and the first edge of the cell frame 1120.

The first fastening holes 1124 may be formed at positions adjacent to four corners of the cell frame 1120, respectively. Each of the fastening members 1400 is inserted into each of the first fastening holes 1124. The first fastening holes 1124 may have various shapes, and the shapes are not specifically limited. For example, the first fastening holes 1124 may have a circular shape.

The interconnecting members 1130 serve to connect the solid oxide fuel cell stack 1000 with an external circuit as well as to electrically connect the unit cells 1110 with each other. To this end, the interconnecting members 1130 may be formed of a conductive ceramic or metallic material. For example, the interconnecting members 1130 may be formed of a $LaCrO_3$-based ceramic material having a perovskite structure or an iron (Fe)-chrome (Cr)-based metallic material.

Each of the interconnecting members 1130 may have a quadrangular plate structure having the same shape as the cell frame 1120. For example, each of the interconnecting members 1130 may include a second fuel supplying opening and a second fuel discharging opening formed at positions corresponding to the first fuel supplying opening 1122A and the first fuel discharging opening 1122B of the cell frame 1120, and a plurality of second fastening holes 1134 formed at positions corresponding to the first fastening holes 1124 of the cell frame 1120.

Further, each of the interconnecting members 1130 may include a fuel path and an air path formed at both surfaces thereof, respectively. The fuel path may be formed at an area of a first surface of the interconnecting member 1130 corresponding to the channel opening 1121 of the cell frame 1120 so as to be in communication with the second fuel supplying opening and the second fuel discharging opening. The air path may be formed at an area of a second surface of the interconnecting member 1130 opposite the first surface, which corresponds to the channel opening 1121 of the cell frame 1120, so as to be in communication with the second fuel supplying opening and the second fuel discharging opening.

The interconnecting members 1130 may further include a first interconnecting member 1130A disposed between the upper plate 1200 and the uppermost unit cell 1110, a plurality of second interconnecting members 1130B disposed among the unit cells 1110, and a third interconnecting member 1130C disposed between the lower plate 1300 and the lowermost unit cell 1110. The first interconnecting member 1130A and the third interconnecting member 1130C may serve as current collectors connected with the external circuit, and may further include a contact terminal which connects the solid oxide fuel cell stack 1000 with the external circuit, compared with the second interconnecting members 1130B. However, the fuel path or the air path may not be formed at an upper surface of the first interconnecting member 1130A facing the upper plate 1200 and a lower surface of the third interconnecting member 1130C facing the lower plate 1300.

The sealing member 1140 is disposed between the cell frame 1120 and the interconnecting member 1130 adjacent to the cell frame 1120 so as to prevent the fuel and the air from being mixed with each other or leaking to the outer side. The sealing member 1140 may be formed of a glass material, a complex material of glass and ceramic, or the like.

The sealing member 1140 may include a first sealing member 1140A disposed between the first surface of the interconnecting member 1130 having the fuel path and the cell frame 1120 facing the first surface, and a second sealing member 1140B disposed between the second surface of the interconnecting member 1130 having the air path and the cell frame 1120 facing the second surface. The first sealing member 1140A may include a first sealing portion forming a closed curve which surrounds the second fuel supplying opening, the fuel path and the second fuel discharging opening of the interconnecting member 1130, a second sealing portion forming a closed curve which surrounds the second air supplying opening of the interconnecting member 1130, and a third sealing portion forming a closed curve which surrounds the second air discharging opening of the interconnecting member 1130. The second sealing member 1140B may include a fourth sealing portion forming a closed curve which surrounds the second air supplying opening, the air path and the second air discharging opening of the interconnecting member 1130, a fifth sealing portion forming a closed curve which surrounds the second fuel supplying opening of the interconnecting member 1130, and a sixth sealing portion forming a closed curve which surrounds the second fuel discharging opening of the interconnecting member 1130.

The spacer member 1150 is disposed between the interconnecting member 1130 and the cell frame 1120 adjacent to the interconnecting member 1130 and serves to maintain an interval therebetween. The spacer member 1150 may be disposed at an area between the cell frame 1120 and the interconnecting member 1130, which is not sealed by the sealing member 1140, and may not have fluidity at a high temperature, for example, even at a transition temperature or more of a material forming the sealing member 1140, and may be formed of an insulating material. For example, the spacer member 1150 may be formed of a mica or insulating ceramic material.

In a process of forming the solid oxide fuel cell stack 1000, construction elements of the solid oxide fuel cell stack 1000 are stacked, and a heat treatment which heats the stacked elements at a transition temperature or more of the glass material forming the sealing member 1140, while maintained in a pressed state, is performed to bond the sealing member 1140 with the cell frame 1120 and the interconnecting member 1130. In this process, when only the sealing member 1140 is disposed between the interconnecting member 1130 and the cell frame 1120 adjacent to the interconnecting member 1130, there may be a problem in that an interval between the cell frame 1120 and the interconnecting member 1130 is non-uniform due to the fluidity of the sealing member 1140. When the interval between the cell frame 1120 and the interconnecting member 1130 is non-uniform, the durability of the solid oxide fuel cell stack 1000 may be degraded due to stress concentration, and also electrical contact resistance between the unit cell 1110 and the interconnecting member 1130 may be increased, and thus efficiency of the solid oxide fuel cell stack 1000 may be lowered.

The spacer member 1150 is implemented to solve the problem. Since the spacer member 1150 is formed of the mica or insulating ceramic material and thus hardly has any fluidity in the high heat treatment process, the interval between the cell frame 1120 and the interconnecting member 1130 may be constantly maintained during a process of manufacturing the solid oxide fuel cell stack 1000. Hereinafter, the spacer member 1150 will be described with reference to FIGS. 5, 6A and 6B.

Figure 5:
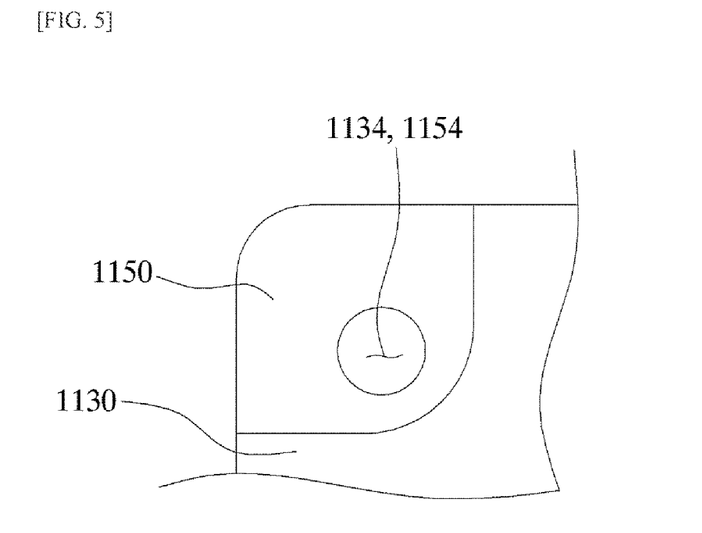
FIG. 5 is a partial plan view illustrating a spacer member according to one embodiment of the present invention.

FIG. 5 is a partial plan view illustrating the spacer member according to one embodiment of the present invention.

Referring to FIG. 5 with FIGS. 1, 2, the spacer member 1150 may include four corner spacers 1150 disposed between four corners of the interconnecting member 1130 and four corners of the cell frame 1120, respectively.

Each of the corner spacers 1150 may have a constant thickness, flat upper and lower surfaces and may include a third fastening hole 1154 corresponding to the first fastening hole 1124 of the cell frame 1120 and the second fastening hole 1134 of the interconnecting member 1130. The third fastening hole 1154 of the corner spacer 1150 may have the same shape and size as the first fastening hole 1124 of the cell frame 1120 and the second fastening hole 1134 of the interconnecting member 1130.

If the interval equivalence between the cell frame 1120 and the interconnecting member 1130 is enhanced, a shape of the flat surface of each of the corner spacers 1150 is not specifically limited. For example, each of the corner spacers 1150 may have a formal shape of the flat surface, such as a circular shape, an elliptical shape and a polygonal shape, as well as an informal shape thereof.

Each of the corner spacers 1150 may be a dependent element which may be separated from the interconnecting member 1130 and the cell frame 1120. On the other hand, each of the corner spacers 1150 may be a coated film which is coated on a surface of the interconnecting member 1130 or the cell frame 1120 to have a predetermined thickness.

When the sealing member 1140 and the spacer member 1150 are disposed between the cell frame 1120 and the interconnecting member 1130, and then pressed at a high temperature to bond the sealing member 1140 with the cell frame 1120 and the interconnecting member 1130, the sealing member 1140 is widely spread due to fluidity, and thus the sealing member 1140 may be adjacent to or in contact with a side surface of the spacer member 1150.

Figure 6A:
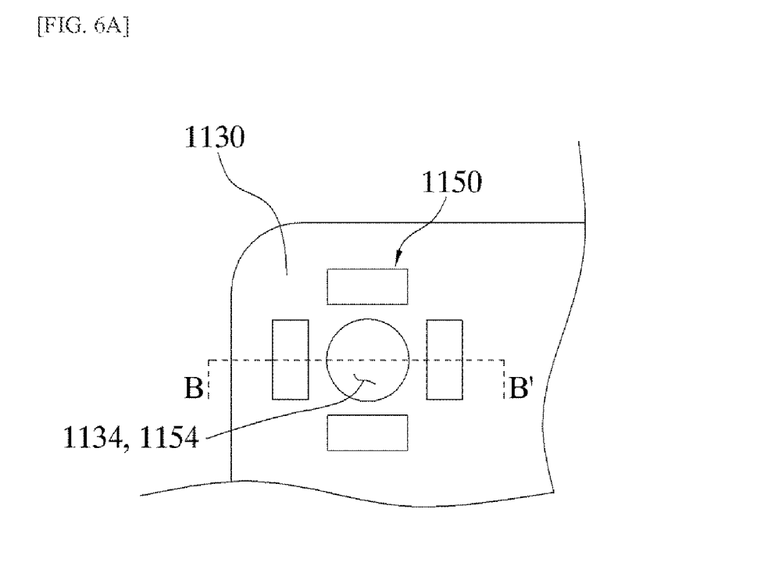
FIG. 6A is a partial plan view illustrating a spacer member according to another embodiment of the present invention.
Figure 6B:
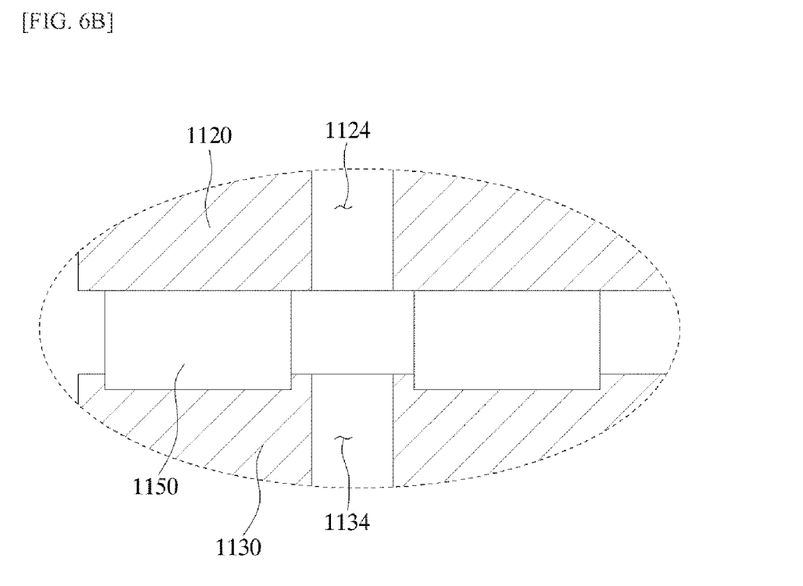
FIG. 6B is cross-sectional view taken along line B-B' of FIG. 6A.

FIG. 6A is a partial plan view illustrating the spacer member according to another embodiment of the present invention, and FIG. 6B is cross-sectional view taken along line B-B' of FIG. 6A.

Referring to FIGS. 6A and 6B with FIGS. 1 and 2, the spacer member 1150 may include four corner spacers 1150 may include four corner spacers 1150 disposed between four corners of the interconnecting member 1130 and four corners of the cell frame 1120, respectively.

The corner spacers 1150 may include one or more spacer patterns disposed to be adjacent to the fastening member 1400 inserted into the first fastening hole 1124 of the cell frame 1120 and the second fastening hole 1134 of the interconnecting member 1130 and having a predetermined height. In this case, an insertion groove into which the spacer patterns are inserted may be formed in the cell frame 1120 or the interconnecting member 1130. For example, as illustrated in FIG. 6B, the insertion groove into which the spacer patterns are inserted may be formed in a surface of the interconnecting member 1130. On the other hand, although not illustrated in the drawings, the insertion groove may be formed in a surface of the cell frame 1120, or may be formed in the surfaces of both of the cell frame 1120 and the interconnecting member 1130. The number and shapes of the spacer patterns are not specifically limited. For example, as illustrated in FIG. 6A, each of the corner spacer 1150 may include four rectangular parallelepiped spacer patterns arranged to surround the second fastening hole 1134 of the interconnecting member 1130.

Referring to FIGS. 1 and 2 again, the upper plate 1200 and the lower plate 1300 are disposed at upper and lower portions of the unit cell stacking structure 1100, respectively, such that a uniform pressure is applied to the unit cell stacking structure 1100. The upper plate 1200 may have fourth fastening holes 1204 which are respectively connected with the first fastening holes 1124 of the cell frame 1120 and the second fastening holes 1134 of the interconnecting member 1130, and into which the fastening members 1400 are inserted, and the lower plate 1300 may have fifth fastening holes 1304 which respectively correspond to the fourth fastening holes 1204 of the upper plate 1200, such that the fastening members 1400 are inserted. Although not illustrated in the drawings, an external fuel supplying part (not shown) and an external air supplying part (not shown) are connected with one of the upper plate 1200 and the lower plate 1300.

The fastening member 1400 couples the upper plate 1200, the unit cell stacking structure 1100 and the lower plate 1300, such that the upper and lower plates 1200 and 1300 uniformly press the unit cell stacking structure 1100. In the present invention, four fastening members 1400 fastened to four corners of the solid oxide fuel cell stack 1000 may be used. Hereinafter, the fastening members 1400 will be described with reference to FIGS. 7A and 7B.

Figure 7A:
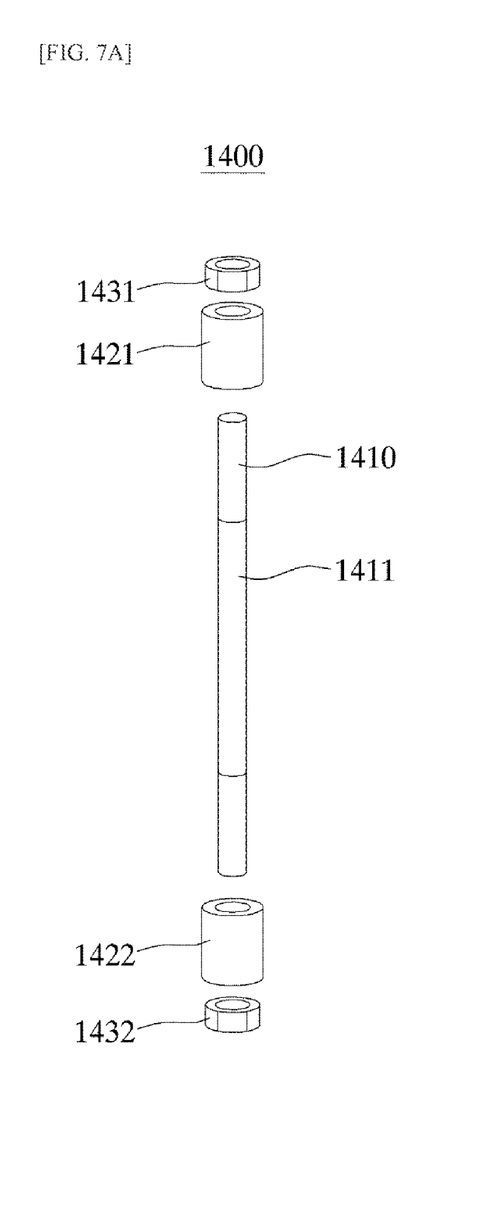
FIG. 7A is a perspective view illustrating a fastening member according to one embodiment of the present invention.

FIG. 7A is a perspective view illustrating the fastening member according to one embodiment of the present invention.

Referring to FIG. 7A with FIGS. 1 and 2, each of the fastening members 1400 may include a bolt 1410, a first washer 1421, a second washer 1422, a first nut 1431 and a second nut 1432.

The bolt 1410 may pass through the upper plate 1200, the unit cell stacking structure 1100 and the lower plate 1300. That is, the bolt 1410 may pass through the fourth fastening hole 1204 of the upper plate 1200, the first fastening holes 1124 of the cell frames 1120, the second fastening holes 1134 of the interconnecting members 1130, the third fastening holes 1154 of the spacer members 1150 and the fifth fastening hole 1304 of the lower plate 1300. A length of the bolt 1410 may be longer than a sum of thicknesses of the upper plate 1200, the unit cell stacking structure 1100 and the lower plate 1300. Both ends of the bolt 1410 may have screw threads to which the first and second nuts 1431 and 1432 are fastened.

The bolt 1410 may include an insulating film 1411 formed on a surface thereof. The insulating film 1411 may be formed of an insulating ceramic material, a glass material or the like.

While the solid oxide fuel cell stack 1000 is operated at a high temperature, an oxide may grow from the surface of the bolt 1410 and surfaces of the interconnecting members 1130, and thus electrical insulation between the bolt 1410 and the interconnecting members 1130 may be broken. The insulating film 1411 formed on the surface of the bolt 1410 may prevent the oxide from growing from the surface of the bolt 1410, and thus the electrical insulation between the bolt 1410 and the interconnecting members 1130 may be prevented from being broken. The insulating film 1411 is an element which prevents insulation breakdown between the bolt 1410 and the interconnecting members 1130 of the unit cell stacking structure 1100. Therefore, the insulating film 1411 may be formed on at least a portion of the surface of the bolt 1410 inserted into the unit cell stacking structure 1100.

The first washer 1421 and the first nut 1431 may be inserted onto one end portion of the bolt 1410 protruding above the upper plate 1200, and the second washer 1422 and the second nut 1432 may be inserted onto the other end portion of the bolt 1410 protruding under the lower plate 1300. That is, the first washer 1421 may be disposed between the upper plate 1200 and the first nut 1431 to press the upper plate 1200 during thermal expansion, and the second washer 1422 may be disposed between the lower plate 1300 and the second nut 1432 to press the lower plate 1300 during the thermal expansion.

The first and second washers 1421 and 1422 may be formed of a material having a greater thermal expansion coefficient than that of the bolt 1410 so as to press the upper plate and the lower plate during the thermal expansion.

In general, the solid oxide fuel cell is operated at a high temperature of about 600 to 1000° C. The bolt 1410 as well as the solid oxide fuel cell stack 1000 is thermally expanded at such an operation temperature of the solid oxide fuel cell. In general, the bolt 1410 is more expanded than the solid oxide fuel cell stack 1000 formed of a ceramic, glass, or metallic material. When the bolt 1410 is more expanded than the solid oxide fuel cell stack 1000, the pressure applied to the solid oxide fuel cell stack 1000 by the fastening member 1400 is reduced, and the reduction in the pressure may cause various problems such as sealing breakdown and degradation of the durability, when the solid oxide fuel cell stack 1000 is operated for a long period of time.

In the present invention, the first and second washers 1421 and 1422 formed of the material having the greater thermal expansion coefficient than that of the bolt 1410 are disposed between the first nut 1431 and the upper plate 1200 and between the second nut 1432 and the lower plate 1300 so as to compensate a difference of the thermal expansion coefficient between the bolt 1410 and the solid oxide fuel cell stack 1000, thereby enhancing thermal stability of the solid oxide fuel cell stack 1000.

Meanwhile, as illustrated in FIG. 7A, each of the first and second washers 1421 and 1422 may have a single structure, as illustrated in FIG. 7A, or may have a structure in which a plurality of washers having a relatively low height are stacked.

Figure 7B:
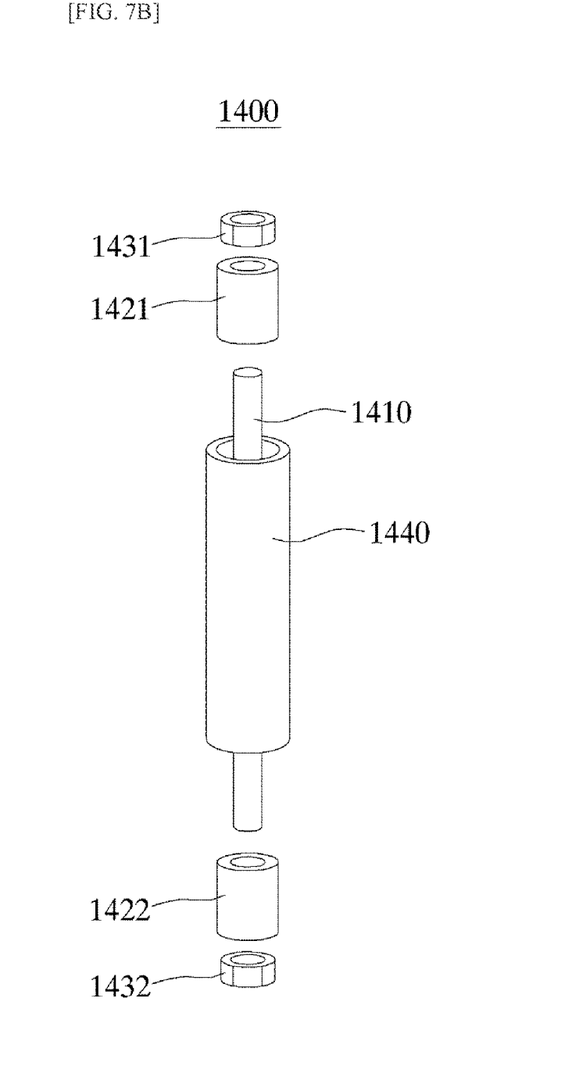
FIG. 7B is a perspective view illustrating a fastening member according to another embodiment of the present invention.

FIG. 7B is a perspective view illustrating the fastening member according to another embodiment of the present invention.

Referring to FIG. 7B with FIGS. 1 and 2, each of the fastening members 1400 may include a tubular insulating material 1440, a bolt 1410, a first washer 1421, a second washer 1422, a first nut 1431 and a second nut 1432. Since the first washer 1421, the second washer 1422, the first nut 1431 and the second nut 1432 are substantially the same as those described with reference to FIG. 7A, the description thereof will be omitted.

The tubular insulating material 1440 may be disposed in a stack of the upper plate 1200, the unit cell stacking structure 1100 and the lower plate 1300, may have a through hole therein through which the bolt 1410 is inserted, and may be formed of an insulating material. For example, the tubular insulating material 1440 may be formed of an insulating ceramic material, a glass material or the like. The tubular insulating material 1440 may serve to prevent the insulation breakdown between the connecting material 1130 and the bolt 1410 in the unit cell stacking structure 1100.

When the tubular insulating material 1440 protrudes to an outer side of the stack of the upper plate 1200, the unit cell stacking structure 1100 and the lower plate 1300, the washers 1421 and 1422 may obstruct pressing of the upper plate 1200 or the lower plate 1300 through the thermal expansion thereof, and thus a length of the tubular insulating material 1440 may be greater than a height of the unit cell stacking structure 1100 and smaller than or the same as an entire height of the upper plate 1200, the unit cell stacking structure and the lower plate 1300.

Meanwhile, FIGS. 7A and 7B illustrate an example in which the fastening member 1400 includes the bolt 1410 having the screw threads formed at both ends thereof. However, the fastening member 1400 may include a bolt (not shown) in which the screw thread is formed at only one end thereof and a head is formed at the other end thereof. In this case, the washer may be provided at only one of the upper plate 1200 and the lower plate 1300.

According to the present invention as described above, since the sealing member and the spacer member are disposed between the cell frame and the interconnecting member, the interval equivalence between the cell frame and the interconnecting member can be enhanced.

Since the solid oxide fuel cell stack is fastened using the washer formed of the material having the greater thermal expansion coefficient than that of the bolt, the sealing ability and the long term stability of the solid oxide fuel cell stack can be enhanced.

Also, since the solid oxide fuel cell stack is fastened using the bolt having the insulating film formed on the surface thereof or surrounded by the tubular insulating material, the electrical stability of the solid oxide fuel cell stack can be enhanced.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A solid oxide fuel cell stack comprising:
   a unit cell of a solid oxide fuel cell;
   a cell frame configured to support an edge portion of the unit cell;
   an interconnecting member disposed under the cell frame and electrically connected with the unit cell;
   a sealing member disposed between a first area of a lower surface of the cell frame and the interconnecting member and formed of a glass material or a complex material of glass and ceramic;
   a spacer member disposed between a second area, which is adjacent to the first area, of the lower surface of the cell frame and the interconnecting member, and formed of a mica or an insulating ceramic which has a transition temperature greater than that of the material of the sealing member, and configured to uniformly maintain an interval between the cell frame and the interconnecting member;
   an upper plate and a lower plate interposing the unit cell, the cell frame, the interconnecting member, the sealing member, and the spacer member therebetween; and
   a fastening member comprising a bolt passing through the upper plate, the cell frame, the interconnecting member, and the lower plate, a nut fastened to one end of the bolt, a washer disposed between the nut and the upper plate or between the nut and the lower plate and formed of a material having a greater thermal expansion coefficient than that of the bolt, and a tubular member disposed within a through hole which is formed in a stack of the upper plate, the unit cell, the cell frame, the interconnecting member, the sealing member, the spacer member, and the lower plate and formed of an insulating material,
   wherein the bolt passes through the tubular member.

2. The solid oxide fuel cell stack of claim 1, wherein the bolt comprises an insulating film formed on a surface thereof and formed of an insulating ceramic or glass material.

3. The solid oxide fuel cell stack of claim 1,
   wherein the spacer member comprises a fastening hole into which the fastening member is inserted.

4. The solid oxide fuel cell stack of claim 3, wherein the cell frame and the interconnecting member have a plurality of corners, and the spacer member comprises a plurality of corner spacers disposed to be adjacent to the plurality of corners, respectively, and the fastening member comprises a plurality of bolts which pass through the plurality of corner spacers, respectively.

5. The solid oxide fuel cell stack of claim 4, wherein each of the corner spacers comprises a coating film formed on one of a surface of the cell frame and a surface of the interconnecting member.

6. The solid oxide fuel cell stack of claim 1,
   wherein the spacer member comprises a plurality of spacer patterns disposed to be adjacent to the fastening member.

7. The solid oxide fuel cell stack of claim 6, wherein an insertion groove into which the spacer pattern is inserted is formed in one of a surface of the cell frame and a surface of the interconnecting member.

* * * * *